United States Patent
Yun

(10) Patent No.: US 11,584,283 B2
(45) Date of Patent: Feb. 21, 2023

(54) PIPE STANCHION MOUNTING STRUCTURE

(71) Applicants: HYUNDAI MOTOR COMPANY, Seoul (KR); KIA CORPORATION, Seoul (KR)

(72) Inventor: Sun Hyuk Yun, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/496,088

(22) Filed: Oct. 7, 2021

(65) Prior Publication Data

US 2023/0010308 A1    Jan. 12, 2023

(30) Foreign Application Priority Data

Jul. 12, 2021  (KR) ........................ 10-2021-0090724

(51) Int. Cl.
*B60N 3/02*    (2006.01)

(52) U.S. Cl.
CPC ............. *B60N 3/026* (2013.01); *Y10T 16/498* (2015.01)

(58) Field of Classification Search
CPC ...... B60N 3/026; B60N 3/02; A47B 96/1425; A47K 17/022; Y10T 16/498
USPC ....................................................... 296/1.02
See application file for complete search history.

(56) References Cited

U.S. PATENT DOCUMENTS

| | | | | |
|---|---|---|---|---|
| 4,498,204 A | * | 2/1985 | Warner | A47K 3/003 4/605 |
| 4,712,822 A | * | 12/1987 | Janos | B60P 3/14 248/677 |
| 5,791,634 A | * | 8/1998 | Brown | B60N 3/02 256/65.02 |
| 5,826,847 A | * | 10/1998 | Warner | F16B 7/1463 248/200.1 |
| 6,082,879 A | * | 7/2000 | Myburgh | B60Q 3/47 362/543 |
| 6,131,979 A | * | 10/2000 | McGhee | B60N 3/026 296/24.3 |
| 6,350,048 B1 | * | 2/2002 | Stanton | B60Q 3/43 362/478 |
| 7,971,835 B2 | * | 7/2011 | Ehrman | F16M 13/02 248/125.7 |
| 9,827,893 B2 | * | 11/2017 | Stott | B60R 13/02 |
| 2002/0134976 A1 | * | 9/2002 | Swartz | A47K 17/022 256/59 |

FOREIGN PATENT DOCUMENTS

CN  208997476 U  * 6/2019

* cited by examiner

*Primary Examiner* — Jason S Morrow
(74) *Attorney, Agent, or Firm* — McDonnell Boehnen Hulbert & Berghoff LLP

(57) ABSTRACT

A pipe stanchion mounting structure includes an upper mounting section configured to fixedly mount an upper end of a pipe stanchion on an upper part of a vehicle body, and a lower mounting section configured to mount a lower end of the pipe stanchion on a lower part of the vehicle body in a vertically movable manner, wherein the upper mounting section includes a first mounting bracket fixedly fastened to the upper part of the vehicle body, and a screw part integrally formed on an upper side of the pipe stanchion so as to be fixedly screwed into the first mounting bracket.

10 Claims, 7 Drawing Sheets

PIPE STANCHION MOUNTING STRUCTURE

CROSS REFERENCE TO RELATED APPLICATIONS

The present application claims priority to Korean Patent Application No. 10-2021-0090724, filed on Jul. 12, 2021, the entire contents of which is incorporated herein for all purposes by this reference.

BACKGROUND

Field

The present disclosure relates to a structure for mounting a pipe stanchion in vehicles and, more particularly, to a structure for mounting a pipe stanchion by coupling same to a floor and a roof of a vehicle such as a bus.

Description of the Related Art

As is known, a pipe stanchion, which is a kind of indoor column structure, is mounted inside a passenger transport bus for passenger safety. A plurality of pipe stanchions may be mounted near an entrance or an indoor passage in a bus such that the pipe stanchions are connected to the floor and the roof of the bus body.

These pipe stanchions are mounted to the floor and roof of the vehicle body at the lower end and upper end, respectively, such that the pipe stanchions extend wholly in the vertical direction, or otherwise a part of the pipe stanchion, for example, an upper part extends in an inclined direction and the rest extends in the vertical direction.

The pipe stanchion serves as both a bar structure for maintaining the external shape of a vehicle body and a handle for passenger safety, and it is common that a plurality of stanchions are mounted at predetermined intervals for the safety of passengers standing in or passing through an indoor passage.

In a typical bus body, the height difference may exist between the floor and the roof due to manufacturing tolerance. In order to accommodate such a height difference when assembling the pipe stanchion onto the bus body, the pipe stanchion should be mounted on the floor and the roof in the vehicle body in a vertically movable manner. That is, when the pipe stanchion is mounted on the vehicle body (floor and roof), both ends are able to move vertically by the mounting structure.

In addition, in the case of a large body structure such as a bus, during traveling, the floor and roof are elastically deformed according to the curvature of the road surface, so that the mounting structures mounted on the floor and roof, respectively, to mount both ends of the pipe stanchion may be relatively displaced to each other in conjunction with the elastic deformation of the vehicle body.

Accordingly, in addition to accommodating the height difference, the pipe stanchion aims at absorbing the above relative displacement upon the elastic deformation of the vehicle body by allowing the ends of the pipe stanchion to be movably coupled to the mounting structure, or the mounting structure to be slidably and movably coupled to the vehicle body.

FIGS. 1 and 2 are views illustrating an upper mounting structure for a pipe stanchion according to the prior art, wherein FIG. 1 is a perspective view illustrating a state in which an upper end of a pipe stanchion is coupled to an upper mounting structure and FIG. 2 is a cross-sectional view of FIG. 1.

As illustrated, the pipe stanchion is coupled to an upper mounting bracket 2 in such a manner that the upper end of the pipe stanchion 1 is fixedly inserted into a pipe-shaped part 3 of the upper mounting bracket and then a plurality of screws 4 is screwed through the pipe-shaped part 3 and the upper end of the pipe stanchion 1.

At this time, the upper side of the mounting bracket 2 is provided with open rectangular long holes 2a extending in the vertical direction so that the upper side of the mounting bracket 2 is vertically-movably coupled to a coupling structure (not shown) for a roof through the holes 2a.

In addition, the pipe stanchion is also coupled to a lower mounting bracket (not shown) in such a manner that in a state in which the lower mounting bracket (not shown) is fixed to the floor of the vehicle body, the lower end of the pipe stanchion 1 is mounted on the lower mounting bracket in a vertically movable manner. Accordingly, the height difference between the floor and the roof can be accommodated, and the relative displacement between the upper and lower mounting brackets occurring upon the elastic deformation of the vehicle body can also be accommodated.

However, the conventional stanchion mounting structure has the following problems.

First, in the conventional stanchion mounting structure, the lower end of the pipe stanchion is mounted on the lower mounting structure attached to the floor of the vehicle body in a vertically slidable and movable manner, and in a state in which the upper end of the pipe stanchion 1 is integrally assembled onto the upper mounting bracket 2, the upper mounting bracket is coupled to the roof in a vertically movable manner. In this structure, an assembly gap exists between the outer circumferential surface of the upper end of the pipe stanchion 1 and the inner circumferential surface of the pipe-shaped part 3 of the upper mounting bracket 2.

In such a conventional mounting structure, a large amount of load is applied to the upper mounting bracket when elastic deformation of the vehicle body and displacement of the mounting point occur during vehicle operation, and in particular, stress concentration occurs on the screw-coupling sites between the pipe stanchion 1 and the pipe-shaped part 3 of the upper mounting bracket, causing deformation and enlargement in the screw holes 3a through which the screws 4 are fastened. As a result, a problem may arise in that the screws are unscrewed during driving of a vehicle.

In addition, a fricative noise and rattling noise may be generated due to an assembly gap between the pipe-shaped part 3 of the upper mounting bracket and the upper end of the pipe stanchion 1 while the vehicle is running, and these noises may also be generated at the screw-coupling sites due to the enlarged screw holes 3a. In particular, in eco-friendly vehicles which are quieter, passengers may perceive such noises more loudly.

SUMMARY

Accordingly, the present disclosure has been made keeping in mind the above problems occurring in the related art, and an objective of the present disclosure is to provide a pipe stanchion mounting structure capable of preventing noise from being generated between a pipe stanchion and a mounting structure thereof during vehicle operation and of further improving the quietness and durability of the vehicle.

An objective of the present disclosure is not limited to the objective mentioned above, and other objectives not mentioned will be clearly understood by those of ordinary skill in the art to which the present disclosure belongs from the description below.

In order to achieve the above objective, according to one aspect of the present disclosure, there is provided a pipe stanchion mounting structure including an upper mounting section configured to fixedly mount an upper end of a pipe stanchion on an upper part of a vehicle body, and a lower mounting section configured to mount a lower end of the pipe stanchion on a lower part of the vehicle body in a vertically movable manner, wherein the upper mounting section includes a first mounting bracket fixedly fastened to the upper part of the vehicle body, and a screw part integrally formed on an upper side of the pipe stanchion so as to be fixedly screwed into the first mounting bracket.

Here, the upper part of the vehicle body may be a roof of the vehicle body, and the lower part of the vehicle body may be a floor of the vehicle body.

In addition, the first mounting bracket may include a pipe-shaped part having a thread on an inner circumferential surface thereof, wherein the screw part is screwed inside the pipe-shaped part.

In addition, the first mounting bracket may further include a plate part fixedly attached to the upper part of the vehicle body, wherein the pipe-shaped part may be integrally formed with the plate part.

In addition, the plate part may be provided with a circular fastening hole, through which a bolt is fastened to fasten the plate part to the upper part of the vehicle body.

In addition, the screw part may have a thread on the outer circumferential surface thereof to extend a predetermined length along the upper end of the pipe stanchion.

In addition, the screw part may have a lower extension such that at least a portion of the lower screw part is exposed to the outside of the pipe-shaped part when the screw part is screwed into the pipe-shaped part, and the upper mounting section may further include a nut ring fastener having a thread on an inner circumferential surface thereof and being screwed around the exposed lower screw extension of the screw part so as to press against a bottom surface of the pipe-shaped part.

In addition, a thread locker may be applied between the inner circumferential surface of the pipe-shaped part on which the thread is formed and the outer circumferential surface of the screw part on which the thread is formed.

In addition, the lower mounting section may include a second mounting bracket fastened to the lower part of the vehicle body; and a compression member fixedly fastened to the second mounting bracket and into which the lower end of the pipe stanchion is press-fitted.

In addition, the second mounting bracket may be provided with a mounting hole into which the lower end of the pipe stanchion is inserted, and the compression member may have a cylindrical pipe shape to be fixedly inserted into the mounting hole, the compression member may be provided at a lower end thereof with a radially flared flange portion fastened to a lower surface around the mounting hole of the second mounting bracket by means of a fastener.

In addition, the cylindrical pipe shape of the compression member may have an inwardly curved portion such that when the lower end of the pipe stanchion is inserted into the compression member, the lower end of the pipe stanchion is supported in a compressed state at the inwardly curved portion of the compression member.

According to the pipe stanchion mounting structure according to the present disclosure, the lower end of the pipe stanchion is vertically movably coupled to the lower mounting bracket attached to the floor of the vehicle body, while the subassembly between the upper end of the pipe stanchion and the upper mounting bracket, and the roof are integrally combined so that the upper end of the pipe stanchion is completely fixed to the roof, thereby preventing, through vertical movement of the pipe stanchion with respect to the vehicle floor, the movement and relative displacement of the upper and lower mounting points due to the elastic deformation of the vehicle body during vehicle operation, and also preventing generation of noise occurring between the upper end of the pipe stanchion and the mounting bracket, thereby further improving the quietness and durability of the vehicle.

DETAILED DESCRIPTION

Figure 1:
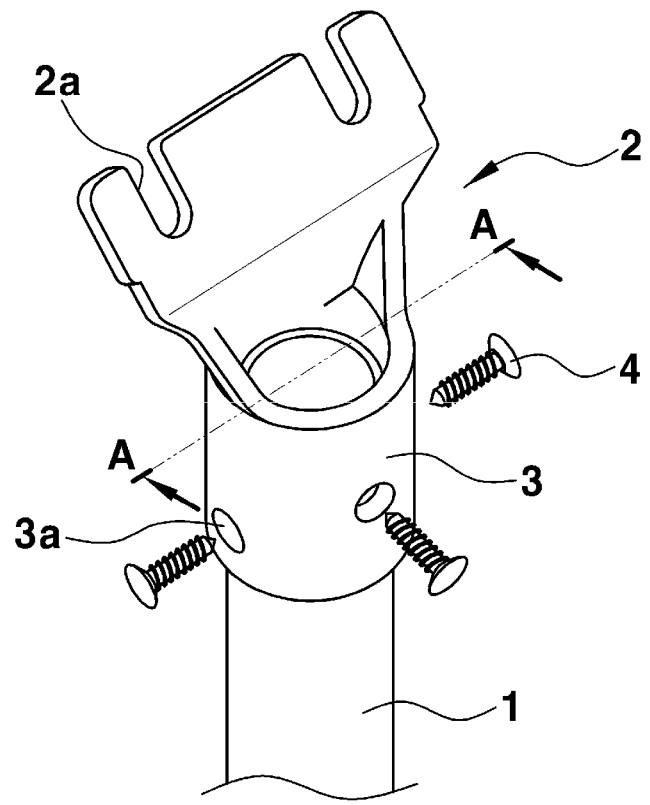
FIG. 1 is a perspective view illustrating a state in which an upper end of a pipe stanchion is coupled to a mounting structure according to the prior art.
Figure 2:
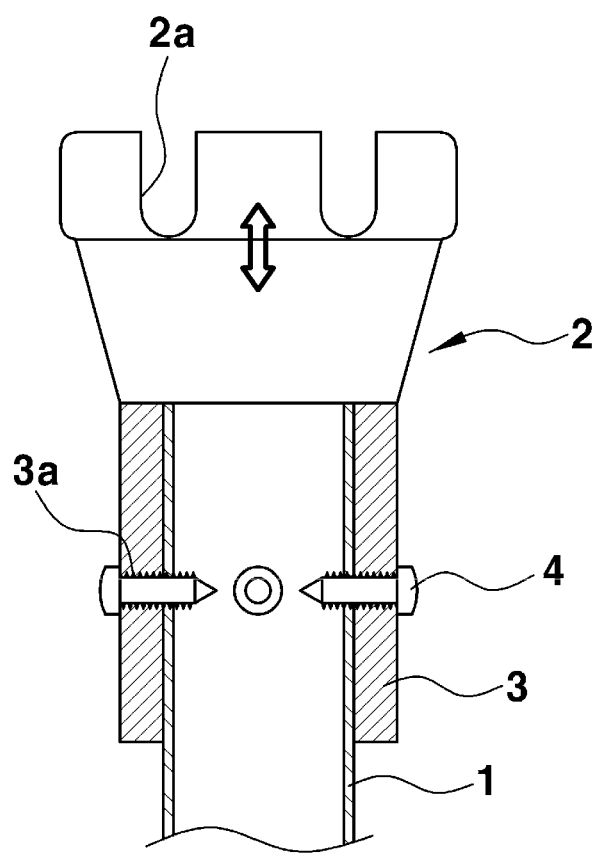
FIG. 2 is a cross-sectional view illustrating a state in which the upper end of the pipe stanchion is coupled to the mounting structure according to the prior art.

Specific structures or functions described in the embodiments of the present disclosure are merely for illustrative purposes. Embodiments according to the concept of the present disclosure may be implemented in various forms, and it should be understood that they should not be construed as being limited to the embodiments described in the present specification, but include all of modifications, equivalents, or substitutes included in the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to", should be construed in the same way.

Like reference numerals denote like components throughout the specification. In the meantime, the terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated components, steps, operations, and/or elements, but do not preclude the presence or addition of one or more other components, steps, operations, and/or elements thereof.

The present disclosure is directed to a structure for mounting a pipe stanchion in a vehicle so that upper and lower ends of the pipe stanchion vertically mounted in a bus interior are coupled to and supported by a roof and a floor of a bus body, respectively.

In particular, the pipe stanchion mounting structure according to the present disclosure is intended to effectively prevent noise from being generated between a pipe stanchion and the mounting structure during traveling of a vehicle and further improve the quietness and durability of the vehicle.

Hereinafter, embodiments of the present disclosure will be described in detail with reference to the accompanying drawings.

Figure 3:
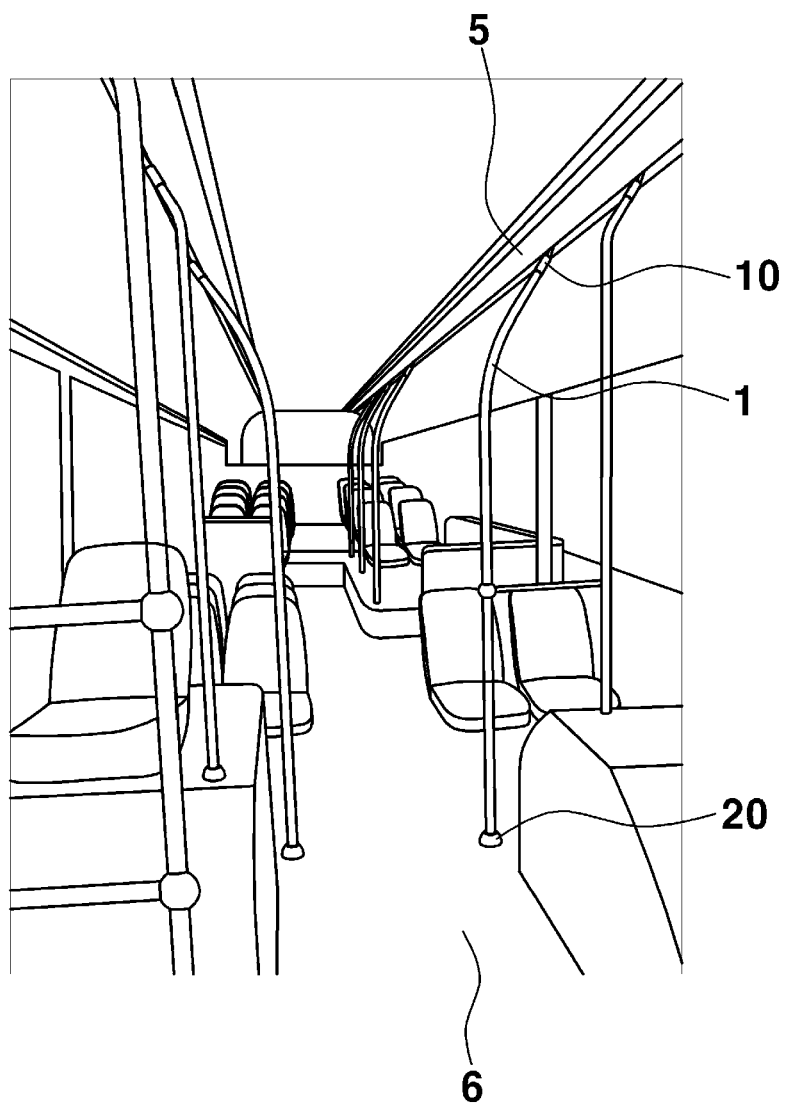
FIG. 3 is a perspective view illustrating a state in which a pipe stanchion is vertically mounted between a roof and a floor of a bus body by a mounting structure according to an embodiment of the present disclosure.
Figure 4:
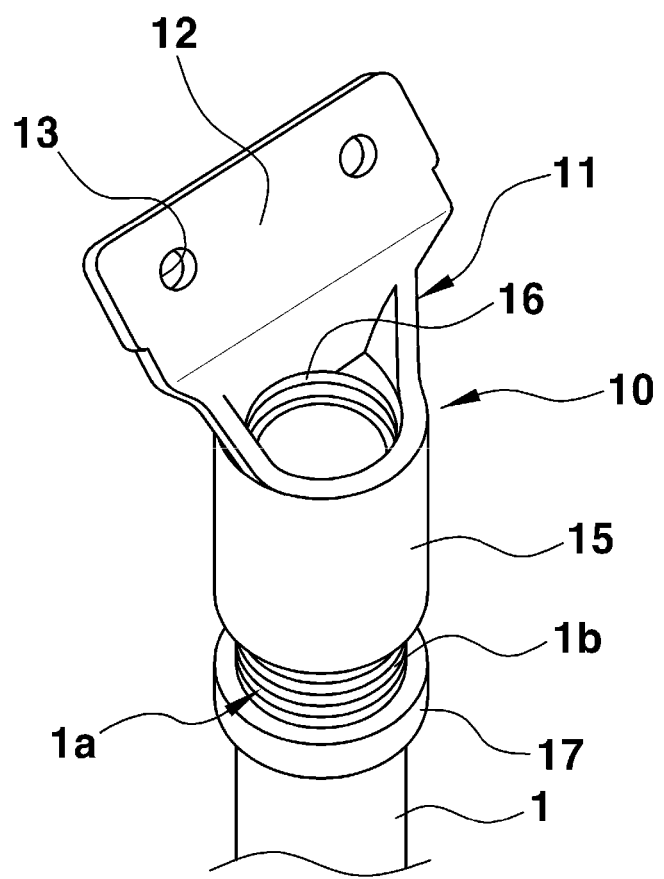
FIG. 4 is a perspective view illustrating a state in which an upper end of the pipe stanchion is coupled to an upper mounting section of the mounting structure according to the embodiment of the present disclosure.

FIG. 3 is a perspective view illustrating a state in which a pipe stanchion is vertically mounted between a roof and a floor of a bus body by a mounting structure according to an embodiment of the present disclosure, and FIG. 4 is a perspective view illustrating a state in which an upper end of the pipe stanchion is coupled to an upper mounting section of the mounting structure according to the embodiment of the present disclosure.

Figure 5:
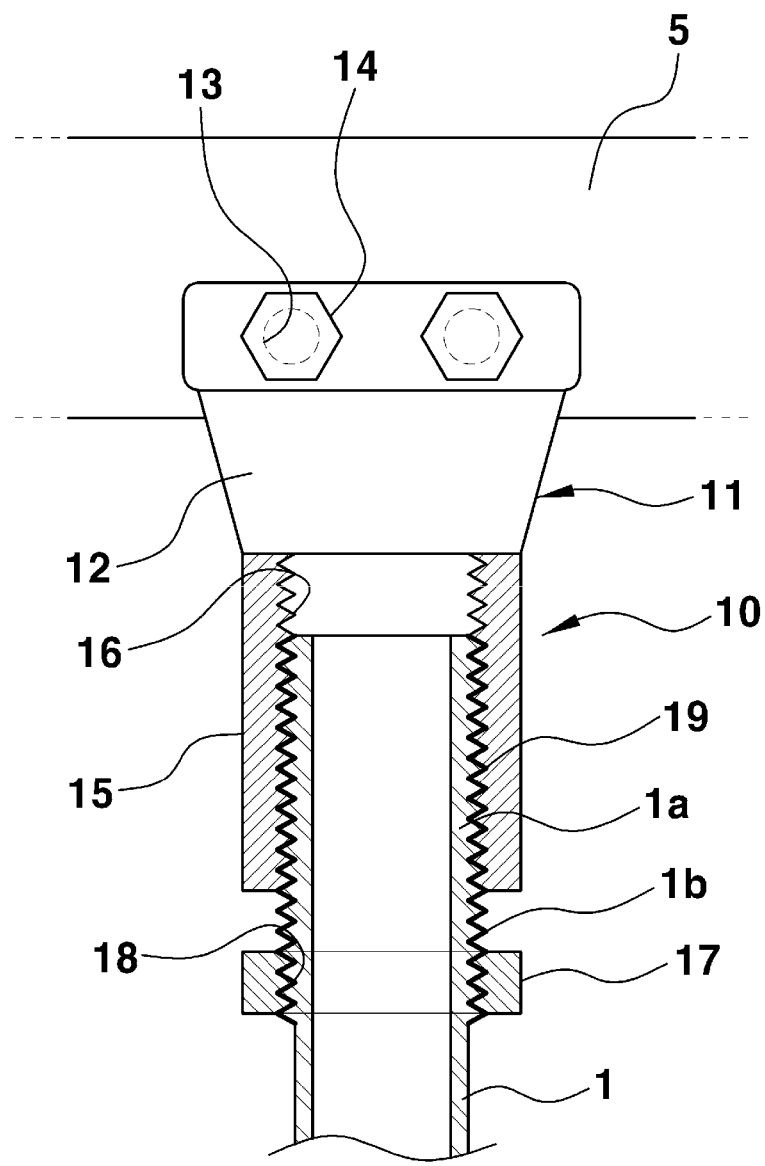
FIG. 5 is a cross-sectional view illustrating the mounting structure before a nut ring fastener of the upper mounting section is fastened according to the embodiment of the present disclosure.
Figure 6:
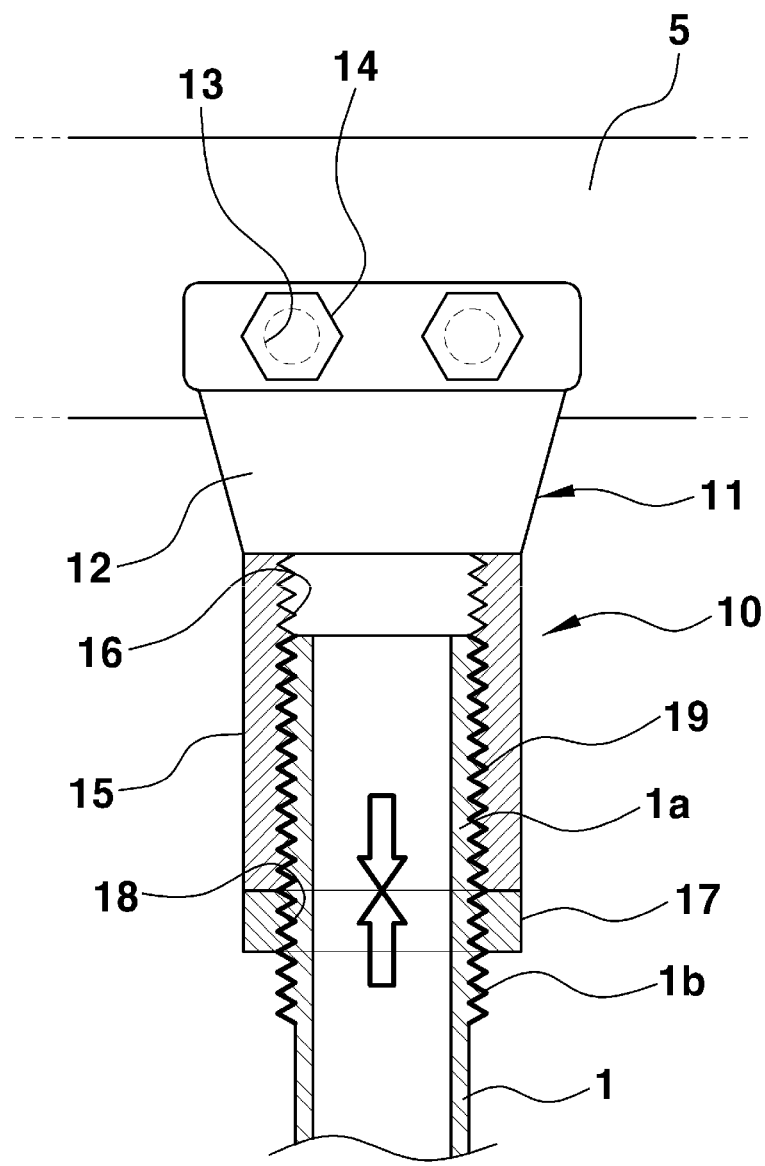
FIG. 6 is a cross-sectional view illustrating the mounting structure after the nut ring fastener of the upper mounting section is fastened according to the embodiment of the present disclosure.

Further, FIG. 5 is a cross-sectional view illustrating the mounting structure before a nut ring fastener of the upper mounting section is fastened according to the embodiment of the present disclosure, and FIG. 6 is a cross-sectional view illustrating the mounting structure after the nut ring fastener of the upper mounting section is fastened according to the embodiment of the present disclosure.

In the present disclosure, the mounting structure of the upper end of the pipe stanchion 1 is changed to a structure that is integrally fixed to the roof 5 of the bus body by bolting and screwing. On the other hand, the mounting structure of the lower end of the pipe stanchion 1 is adapted to have a configuration that is vertically movable with respect to the floor 6 of the bus body.

Describing the configuration in more detail, the mounting structure for a pipe stanchion according to an embodiment of the present disclosure includes an upper mounting section 10 that integrally fastens an upper end of the pipe stanchion 1 to a roof 5 of the vehicle body (the roof corresponds to the upper part of the vehicle body), and a lower mounting section 20 that integrally fastens a lower end of the pipe stanchion 1 to a floor 6 of the vehicle body (the floor corresponds to the lower part of the vehicle body) in a vertically movably manner.

Here, the portion of the vehicle body on which the upper end of the pipe stanchion 1 is mounted by means of the upper mounting section 10 may be a roof panel as the upper part of the vehicle body. In addition, the portion of the vehicle body on which the lower end of the pipe stanchion 1 is mounted by means of the lower mounting section 20 may be a floor panel as the lower part of the vehicle body.

The upper mounting section 10 includes a first mounting bracket 11 that is integrally fixed to the roof 5 (the upper part of the vehicle body) and to which the upper end of the pipe stanchion 1 is fixedly coupled by a screw fastening structure.

The first mounting bracket 11 includes a plate part 12 that is overlapped with and fixedly attached to the roof 5, and a pipe-shaped part 15 that is integrally formed with the plate part 12 and through which the upper end of the pipe stanchion 1 is screwed and fastened.

The plate part 12 has a shape corresponding to the surface shape of the roof so that the plate part can be attached to the roof to overlap the surface of the roof 5. In addition, the plate part 12 is provided with a plurality of fastening holes 13 through which bolts 14 can be inserted.

Accordingly, in a state in which the plate part 12 is attached to the surface of the roof 5, when bolts 14 are screwed into fastening holes (not shown) of the roof through the fastening hole 13, the plate part 12 of the first mounting bracket 11 can be integrally fixed to the roof 5.

The pipe-shaped part 15 is formed in a cylindrical pipe shape having a predetermined inner diameter, outer diameter, and length, and is integrally connected to the lower end of the plate part 12. In addition, a thread 16 is formed on the inner circumferential surface of the pipe-shaped part 15, and in this case, the thread 16 may be formed on the inner circumferential surface thereof along the entire length.

In addition, the upper mounting section 10 further includes a screw part 1a formed at the upper end of the pipe stanchion 1. The screw part 1a is integrally formed with the pipe stanchion 1 to have approximately the same outer diameter, and is screw-coupled into the pipe-shaped part 15 of the first mounting bracket 11.

For this screw coupling, the screw part 1a has a thread 1b formed on the outer circumferential surface, wherein the thread 1b extends a predetermined length at the upper end of the pipe stanchion 1.

As a result, the screw part 1a formed at the upper end of the pipe stanchion 1 is screwed into the pipe-shaped part 15 of the first mounting bracket 11, so that the upper end of the pipe stanchion 1 is integrally coupled to and fixedly supported on the roof 5 by means of the first mounting bracket 11.

Further, in an embodiment of the present disclosure, the screw part 1a has a lower screw extension such that at least a portion of the lower screw part is exposed to the outside of the pipe-shaped part 15 of the first mounting bracket 11 when the screw part is fully screwed into the pipe-shaped part 15. That is, the screw part 1a is longer than the coupling depth of the screw part into the pipe-shaped part 15, so that when the screw part 1a is screwed into the pipe-shaped part 15, a portion of the lower screw part, i.e., the lower screw extension, is exposed to the outside of the pipe-shaped part 15.

In this structure, the upper mounting section 10 may further include a nut ring fastener 17 screwed around a lower screw extension of the screw part that is not screwed into, but exposed to the outside of the pipe-shaped part 15.

The nut ring fastener 17 is a ring-shaped member in which a thread 18 is formed on an inner circumferential surface and which is separately provided from the first mounting bracket 11 such that the ring-shaped member is screw-fastened around the outer circumferential surface of the pipe-shaped part 15 of the first mounting bracket 11. The nut ring fastener 17 may be made of high strength rigid plastic or metal.

In an embodiment of the present disclosure, in a state in which the nut ring fastener 17 is screwed around the lower extension of the screw part 1a, the upper portion of the screw part 1a is inserted and screwed into the pipe-shaped part 15 of the first mounting bracket 11. At this time, the nut ring fastener 17 is rotated to torque-tighten the pipe-shaped part 15 so that the upper surface of the nut ring fastener 17 forcedly contacts and screws up the lower surface of the pipe-shaped part 15 to tighten the pipe-shaped part.

That is, as illustrated in FIG. 5, the screw part 1a formed on the upper side of the pipe stanchion 1 is inserted and screwed into the pipe-shaped part 15 of the first mounting bracket 11, and then the nut ring fastener 17 screwed around the lower extension of the screw part 1a is rotated and screwed.

When the nut ring fastener 17 is rotated in the state of engagement between the threads 1b and 18 formed on the outer circumferential surface of the screw part 1a and the inner circumferential surface of the nut ring fastener 17, respectively, the nut ring 17 screws upward (as viewed from the drawing) along the longitudinal direction of the screw part 1a.

As such, after the nut ring 12 is screwed upward a certain distance or more, the upper surface of the nut ring fastener 17 presses and tightens the bottom surface of the pipe-shaped part 15 as illustrated in FIG. 4. As a result, when completely torque-fastened, the nut ring fastener 17 presses against the bottom surface of the pipe-shaped part 15 to a certain level or more, so that the pipe stanchion 1 including the screw part 1a can be fastened as a whole to the pipe-shaped part 15 without a further rotational movement.

More specifically, as illustrated in FIG. 5, the screw part 1a is screwed into the pipe-shaped part 15 of the first mounting bracket 11 to a required depth, and then, as described above, the nut ring fastener 17 is screwed until the bottom surface of pipe-shaped part 15 is compressed and tightened, thereby completing the fastening operation. Of course, when screwing the screw part 1a into the pipe-shaped part 15 before the fastening the nut ring fastener 17, the screw part 1a is inserted into the pipe-shaped part 15 and then the entire stanchion 1 is rotated and screwed to tighten the screw part.

As described above, after rotating the entire stanchion 1 so that the screw part 1a is screwed into the pipe-shaped part 15 to the required depth, the nut ring fastener 17 is rotated until the bottom surface of the pipe-shaped part 15 is compressed and tightened to a certain level or more as illustrated in the state of FIG. 4. In this state in which the nut ring fastener 17 is fixedly fastened, the pipe stanchion 1 maintains a completely fixedly fastened state without being further rotated in the first mounting bracket 11.

In an embodiment of the present disclosure, a fixing means 19 for increasing the fixing force may be interposed between the inner circumferential surface of the pipe-shaped part 15 and the outer circumferential surface of the screw part 1a, on which the threads 16 and 1b are formed respectively. A thread locker may be used as the fixing means 19. The fixing means may use a commercially available Loctite®.

When used, the thread locker is applied to the outer circumferential surface of the screw part 1a before the screw part 1a is screwed, and then the screw part 1a is inserted and screwed into the pipe-shaped part 15. At this time, the thread locker may be applied to the entire screw part 1a including the lower extension around which the nut ring fastener 17 is screwed.

Figure 7:
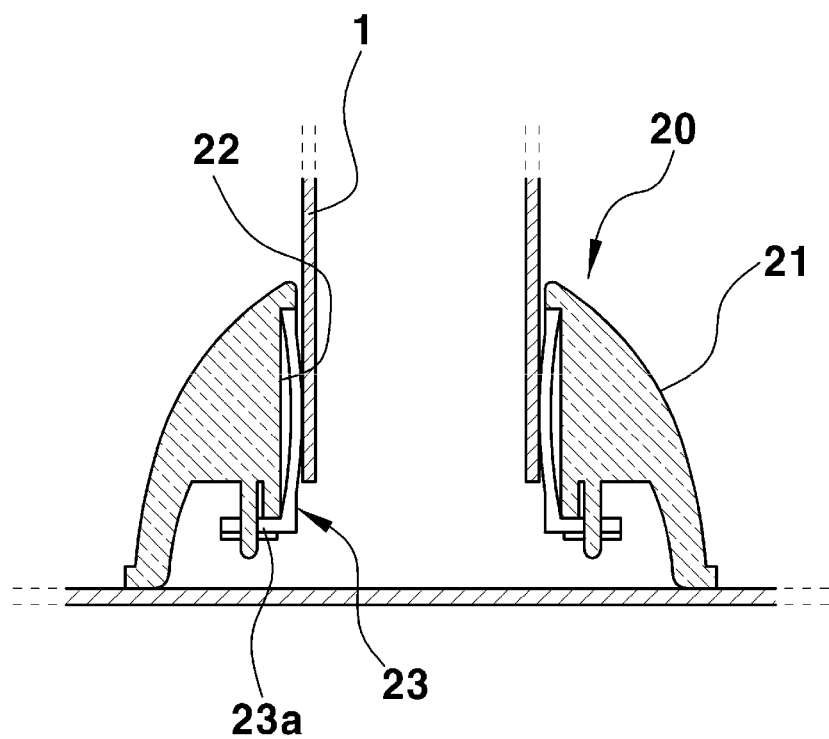
FIG. 7 is a cross-sectional view illustrating the mounting structure in which a lower mounting section and a lower end of the pipe stanchion are fastened together according to the embodiment of the present disclosure.

On the other hand, a lower mounting section will now be described with reference to FIG. 7. FIG. 7 is a cross-sectional view illustrating the mounting structure in which the lower mounting section and the lower end of the pipe stanchion are fastened together according to the embodiment of the present disclosure.

The lower mounting section 20 includes a second mounting bracket 21 fixed to the floor (lower portion of the vehicle body) 6 of the bus body, and a compression member 23 fixedly mounted inside the second mounting bracket 21 and into which a lower end of the pipe stanchion 1 is press-fitted.

The lower end of the second mounting bracket 21 is adapted to be in contact with and supported by the upper surface of the floor 6, and then is fastened to the floor 6 by fastening bolts (not shown) through the bolt holes (not shown) of the lower end into the fastening holes (not shown) of the floor 6. Accordingly, the second mounting bracket 21 is fastened to the upper surface of the vehicle body floor 6.

The second mounting bracket 21 is provided in the central portion with a vertical mounting hole 22 into which the lower end of the pipe stanchion 1 is inserted and coupled, and the compression member 23 is fixedly inserted and displaced in the mounting hole 22.

The compression member 23 is provided at the lower end with a radially flared flange portion 23a, which is in contact with the lower surface around the mounting hole 22 of the second mounting bracket 21 and then fastened to the lower surface by means of fasteners such as bolts.

Accordingly, the compression member 23 can be fastened inside the second mounting bracket 21 so as to support the lower end of the pipe stanchion 1 press-fitted therein.

In addition, as illustrated in FIG. 7, the compression member 23 may be of a cylindrical pipe shape having an inwardly curved portion. Accordingly, when the lower end of the pipe stanchion 1 is inserted into the compression member 23, the lower end of the pipe stanchion 1 can be supported in a compressed state at the inwardly curved portion of the compression member 23.

According to the above-mentioned configuration of the pipe stanchion mounting structure, when the pipe stanchion 1 is mounted, first, the nut ring fastener 17 and the pipe-shaped part 15 of the first mounting bracket 11 are screwed around the outer circumferential surface of the screw part 1a formed on the upper side of the pipe stanchion 1. In addition, the lower mounting section 20 is fastened to the lower end of the pipe stanchion 1. Here, upon fastening the lower mounting section, the lower end of the pipe stanchion 1 is press-fitted inside the compression member 23 of the lower mounting section 20.

Next, after standing the pipe stanchion 1 upright, the second mounting bracket 21 of the lower mounting section 20 fastened to the lower end of the pipe stanchion is fastened to the upper surface of the floor 6 by bolt-fastening, and the first mounting bracket 11 of the upper mounting section 10 fastened to the upper end of the pipe stanchion 1 is fastened to the surface of the roof 5 by bolts 14.

Then, in a state in which the first mounting bracket 11 is fixed to the roof 5, the entire stanchion 1 is rotated such that the screw part 1a can be rotated inside the pipe-shaped part 15 of the first mounting bracket 11. At this time, the lower end of the pipe stanchion 1 is inserted and fixedly press-fitted into the compression member 23 of the lower mounting section 20, and the entire stanchion 1 is rotated until the screw part 1a is inserted into the pipe-shaped part 15 of the first mounting bracket 11 to a predetermined depth.

In this way, when the entire stanchion 1 is rotated, the suspension moves in the axial direction so that the vertical displacement of the pipe stanchion can be adjusted. As a result, the assembly tolerance gaps existing between the floor 6 and the lower mounting section 20 and between the roof 5 and the upper mounting section 10 can be accommodated by the present stanchion mounting structure.

Then, after the screw part 1a is inserted and screwed into the pipe-shaped part 15 to a predetermined depth, the nut ring fastener 17 is rotated and screwed up around the screw part 1a so that the nut ring fastener 17 presses against and tightens the bottom surface of the pipe-shaped part 15 with a certain level of force or more, thereby completing the fastening operation.

After the nut ring fastener 17 is fixedly fastened in this way, in a state in which the nut ring fastener 17 is screwed around the screw part 1a, the upper surface of the nut ring fastener 17 presses the bottom surface of the pipe-shaped part 15 upward, whereas the screwed nut ring fastener 17 applies a downward force to the screw part 1a, so that the pipe-shaped part 15 of the first mounting bracket 11 and the screw part 1a are able to maintain the screwed-fastened state with a large fastening force.

Furthermore, due to the thread locker (such as Loctite®) applied onto the screw part 1a, the pipe stanchion 1 and the pipe-shaped part 15 of the first mounting bracket 11 are not relatively displaced and fastened together, thereby preventing sliding or movement, friction, and noise from occurring between the two former parts.

When the nut ring fastener 17 is fixedly fastened as described above, the pipe stanchion 1 is in a state in which the upper end thereof is rotationally constrained in the upper mounting section 10, that is, the upper end is no longer rotated and remains fixed in the first mounting bracket 11 of the upper mounting section 10. In this way, the upper end of the pipe stanchion 1 is fixed to the vehicle body, whereas the lower end of the pipe stanchion 1 is able to be vertically movable in a state of being press-fitted into the compression member of the lower mounting section 20 as illustrated in FIG. 7.

As a result, in a state in which the pipe stanchion 1 is mounted on the vehicle body, the lower end of the pipe stanchion 1 is movable up and down in the lower mounting section 20 fastened to the floor 6 of the vehicle body, whereas the upper end of the pipe stanchion 1 remains fixed to the vehicle body roof 5 by the above-described upper mounting section 10 so that sliding and friction do not occur even if the vertical movement of the pipe stanchion 1 occurs in the lower mounting section 20.

As a result, according to the present disclosure, vertical movement and adjustment of the pipe stanchion 1 is possible by rotation of the pipe stanchion during mounting, and when the fastening of the nut ring fastener 17 is completed, though the pipe stanchion 1 is rotationally constrained, displacement and vertical movement are possible between the floor 6 and the lower mounting section 20.

In addition, since the upper mounting section 10 and the screw part 1a formed on the upper side of the pipe stanchion 1 are coupled with a large-area contact and a large fastening force, part deformation or gap occurrence can be prevented even when the movement of the pipe stanchion 1 occurs during vehicle running In addition, as illustrated in FIG. 1, while the conventional mounting bracket absorbs assembly tolerances by using the rectangular open long hole 2a extending in the vertical direction, in the present disclosure, the assembly tolerance can be absorbed by the relative displacement and movement between the lower end of the pipe stanchion 1 and the lower mounting section 20. Therefore, the first mounting bracket 11 may be provided with circular fastening holes 13 through which bolts 14 are fastened to the first mounting bracket 11, thereby increasing the rigidity, appearance, and durability of the mounting part. Moreover, the nut ring fastener 17 that prevents loosening of the screw part 1a also contributes to an increase in rigidity and durability of the mounting part.

According to the pipe stanchion mounting structure according to the present disclosure, the lower end of the pipe stanchion is vertically movably coupled to the lower mounting bracket attached to the floor of the vehicle body, while the subassembly between the upper end of the pipe stanchion and the upper mounting bracket, and the roof are integrally combined so that the upper end of the pipe stanchion is completely fixed to the roof, thereby preventing, through vertical movement of the pipe stanchion with respect to the vehicle floor, the movement and relative displacement of the upper and lower mounting points due to the elastic deformation of the vehicle body during vehicle operation, and also preventing generation of noise occurring between the upper end of the pipe stanchion and the mounting bracket, thereby further improving the quietness and durability of the vehicle.

Although the embodiments of the present disclosure have been described in detail, the scope of the present disclosure is not limited to the above-described embodiments, and various modifications and changes performed by those skilled in the art using the basic concepts of the present disclosure defined in the following claims are also included in the scope of the present disclosure.

The invention claimed is:

1. A pipe stanchion mounting structure comprising:
   an upper mounting section configured to fixedly mount an upper end of a pipe stanchion on an upper part of a vehicle body; and
   a lower mounting section configured to mount a lower end of the pipe stanchion on a lower part of the vehicle body in a vertically movable manner;
   wherein the upper mounting section comprises:
      a first mounting bracket fixedly fastened to the upper part of the vehicle body; and
      a screw part integrally formed on an upper side of the pipe stanchion, the screw part configured to be screwed into the first mounting bracket; and
   wherein the lower mounting section comprises:
      a second mounting bracket fastened to the lower part of the vehicle body; and
      a compression member fixedly fastened to the second mounting bracket, and into which the lower end of the pipe stanchion is press-fitted.

2. The pipe stanchion mounting structure of claim 1, wherein the upper part of the vehicle body is a roof of the vehicle body, and the lower part of the vehicle body is a floor of the vehicle body.

3. The pipe stanchion mounting structure of claim 1, wherein the first mounting bracket includes a pipe-shaped part having a thread on an inner circumferential surface, wherein the screw part is screwed inside the pipe-shaped part.

4. The pipe stanchion mounting structure of claim 1, wherein the first mounting bracket further includes a plate part fixedly attached to the upper part of the vehicle body, wherein a pipe-shaped part is integrally formed with the plate part.

5. The pipe stanchion mounting structure of claim 4, wherein the plate part is provided with a circular fastening hole through which a bolt is fastened, to fasten the plate part to the upper part of the vehicle body.

6. The pipe stanchion mounting structure of claim 1, wherein the screw part has a thread on an outer circumferential surface extending a predetermined length along the upper end of the pipe stanchion.

7. The pipe stanchion mounting structure of claim 3, wherein the screw part has a lower extension such that at least a portion of a lower part of the screw part is exposed to an outside of the pipe-shaped part when the screw part is screwed into the pipe-shaped part, and the upper mounting section further includes a nut ring fastener having a thread on an inner circumferential surface, and being screwed around an outer circumferential surface of the exposed lower extension of the screw part so as to press against a bottom surface of the pipe-shaped part.

8. The pipe stanchion mounting structure of claim 3, wherein a thread locker is applied between the inner circumferential surface of the pipe-shaped part on which the thread is formed and an outer circumferential surface of the screw part on which the thread is formed.

9. The pipe stanchion mounting structure of claim 1, wherein the second mounting bracket is provided with a mounting hole into which the lower end of the pipe stanchion is inserted, wherein the compression member has a cylindrical pipe shape to be fixedly inserted into the mounting hole, and wherein the compression member is provided at a lower end thereof with a radially flared flange portion fastened to a lower surface around the mounting hole of the second mounting bracket by means of a fastener.

10. The pipe stanchion mounting structure of claim 9, wherein the compression member has an inwardly curved portion such that when the lower end of the pipe stanchion is inserted into the compression member, the lower end of the pipe stanchion is supported in a compressed state at the inwardly curved portion of the compression member.

* * * * *